United States Patent [19]
Yano et al.

[11] Patent Number: 5,351,017
[45] Date of Patent: Sep. 27, 1994

[54] FIXING DEVICE FOR A NOISE ABSORBER

[75] Inventors: Tsurayuki Yano, Tokyo; Yasuo Yamazaki, Tougane; Tsutomu Yasaku, Tokyo, all of Japan

[73] Assignee: Kitagawa Industries Co., Ltd., Japan

[21] Appl. No.: 837,378

[22] Filed: Feb. 14, 1992

[30] Foreign Application Priority Data

Feb. 20, 1991 [JP] Japan .................. 3-007569[U]

[51] Int. Cl.$^5$ .............................................. H04B 3/28
[52] U.S. Cl. ..................... 333/12; 24/17 B; 24/304; 248/300
[58] Field of Search ....... 24/17 B, 3 R, 304, DIG. 11, 24/482; 248/65, 300, 231.8, 316.7, 205.3; 333/12

[56] References Cited

U.S. PATENT DOCUMENTS

| | | | |
|---|---|---|---|
| 151,036 | 5/1874 | Liebenroth | 24/17 B |
| 2,262,840 | 11/1941 | Gibson et al. | |
| 2,704,302 | 3/1955 | Budd | 24/304 X |
| 3,189,961 | 6/1965 | Heller | |
| 3,363,864 | 1/1968 | Olgreen | 248/68.1 |
| 3,542,321 | 11/1970 | Kahabka | 24/DIG. 11 |
| 3,659,319 | 5/1972 | Enzkson | 24/304 |
| 3,694,863 | 10/1972 | Wasserlein, Jr. | |
| 3,916,055 | 10/1975 | Wagner | |
| 4,457,053 | 7/1984 | Niwa | 24/DIG. 11 X |
| 4,910,362 | 3/1990 | Kinner | 24/304 X |
| 4,983,932 | 1/1991 | Kitagawa | 333/12 |
| 4,999,887 | 3/1991 | Kraus | 248/205.3 X |
| 5,095,296 | 3/1992 | Parker | 333/12 X |

FOREIGN PATENT DOCUMENTS 2219034 11/1989 United Kingdom .

*Primary Examiner*—James R. Brittain
*Attorney, Agent, or Firm*—Davis, Bujold & Streck

[57] ABSTRACT

A fixing device according to this invention easily and securely fixes a noise absorber onto a wire. The fixing device comprises a base member to receive a noise absorber thereon. The fixing device also comprises engaging portions provided on the base member to engage with side edges of the noise absorber. The fixing device further comprises an attaching member to attach the base member to a wire. When the wire with the fixing device attached thereon is inserted into the noise absorber, the engaging portions of the fixing device engage with the noise absorber, thereby fixing the noise absorber securely onto the wire.

16 Claims, 4 Drawing Sheets

FIXING DEVICE FOR A NOISE ABSORBER

BACKGROUND OF THE INVENTION

This invention relates to a fixing device for securing a cylindrical noise absorber to an electric wire. The noise absorber absorbs noises generated by the wire inserted therein.

A conventional noise absorber is cylindrical and molded of ferrite or other magnetic material in order to absorb electric noises in a wire inserted therein. Such a noise absorber is fixed onto a wire by adhesive tape or other fixing means. Since ferrite and other magnetic materials attach poorly to tapes, the noise absorber has a tendency to come off of the tape and fail to stay in the right position on the wire.

The noise absorber may be fixed onto a wire by an adhesive. However, it is extremely laborious to apply an adhesive into a space between an exterior surface of the wire and an inner surface of the noise absorber. Moreover, subsequent work has to wait until the adhesive dries. This method is thus inefficient for manufacturing purposes.

SUMMARY OF THE INVENTION

Wherefore, an object of this invention is to provide a fixing device that can easily and securely fix a cylindrical noise absorber onto a wire.

In order to achieve the above object, a fixing device according to this invention comprises a base member, engaging portions and attaching or securing means. The base member can be inserted into a space between an exterior surface of a wire and an inner surface of a noise absorber. The base member is provided with engaging portions which engage with both axial side edges of the noise absorber when the base member is inserted into the space. The base member is also provided with securing means which attaches the base member onto the exterior surface of the wire.

Another fixing device according to the present invention comprises a base member and engaging portions or means. The base member can be inserted into a space between an exterior surface of a wire and an inner surface of the noise absorber. The base member is resilient so as to press against the exterior surface of the wire and the inner surface of the noise absorber when inserted into the space. The engaging portions are provided on the base member. When the base member is inserted into the space, the engaging portions engage with both axial side edges of the noise absorber.

In the former fixing device according to this invention, the base member is fixed onto the exterior surface of the wire by the securing means or attaching member. When the base member is inserted into the space between the inner surface of the noise absorber and the exterior surface of the wire, the engaging portions provided on the base member engage with both of the axial side edges of the noise absorber. The noise absorber is thus fixed onto the wire via the fixing device of this invention.

In contrast in the latter fixing device, when the base member is inserted into the space between the inner surface of the noise absorber and the exterior surface of the wire, the base member presses the exterior surface of the wire and the inner surface of the noise absorber. This pressure fixes the base member onto the exterior surface of the wire. At the same time, the engaging portions provided on the base member engage with both of the axial side edges of the noise absorber. The noise absorber is thus fixed onto the wire via the fixing device of this invention.

DETAILED DESCRIPTION OF THE PREFERRED EMBODIMENT

Figure 1:
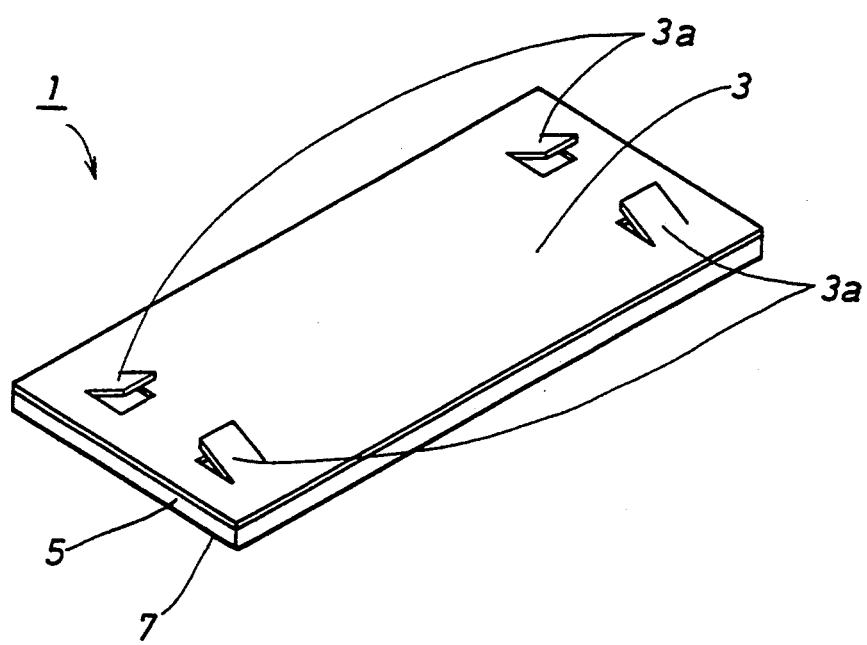
FIG. 1 is a perspective view of a first embodiment of a fixing device.

The embodiments of the fixing device according to the present invention will now be described hereunder referring to the drawings.

First Embodiment

As shown in FIG. 1, a rectangular base member comprising a metal board 3 of a fixing device 1 is provided with two pairs of claws 3a thereon. Each pair of the claws 3a protrudes from a first surface of the metal board in the vicinity of opposed ends of the metal board 3. A sponge 5 is attached on the second opposite surface of the metal board 3. Further, a double-coated adhesive tape 7 is attached on a second surface of the sponge 5 opposite the metal board 3. The double-coated adhesive tape 7 is a conventional one which is a film of synthetic resin coated with an adhesive on both sides thereof. A separable or removable sheet is attached to the side of the adhesive tape 7 opposite the metal board 3. The metal board 3 and the claws 3a are integrally formed as one piece in metal board. Specifically, slits are first made on the metal board 3 in the same shape as the claws 3a. When the parts defined by the slits are pushed outwardly in one direction, the claws 3a are formed. The metal board 3, the claws 3a and the double-coated adhesive tape 7 correspond to a base member, engaging portions and an attaching member, respectively.

Figure 2:
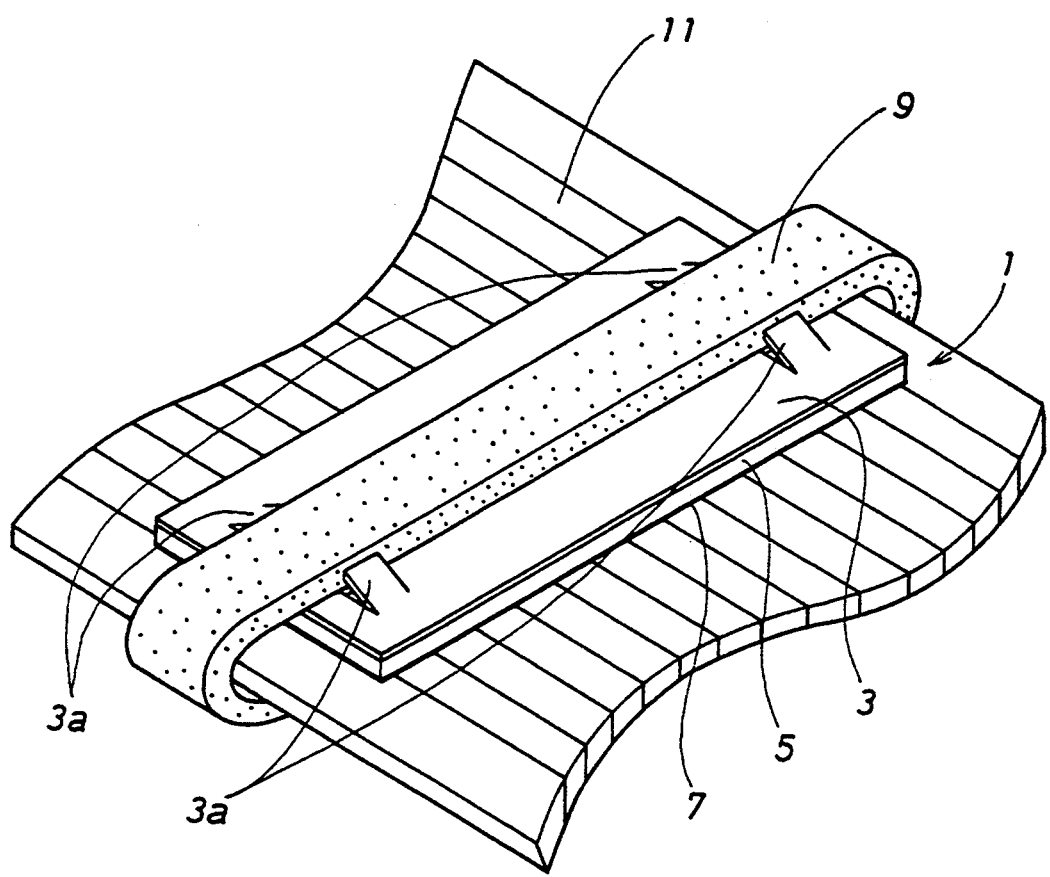
FIG. 2 is a perspective view of the first embodiment of the fixing device in use.

As shown in FIG. 2, the fixing device 1 is inserted into a space between an inner surface of a flat core 9, which act as a noise absorber, and an exterior surface of a flat cable 11, which has wires.

When attaching the fixing device 1, the separable sheet on the tape 7 is peeled off first. Then the fixing device is placed at a desired position on the flat cable 11. When the flat cable 11 and the fixing device 1 attached thereon are inserted into the flat core 9, the flat core 9 can easily be fixed at a desired position on the flat cable 11.

As the fixing device 1 is inserted into the flat core 9, the claws 3a on one side of the fixing device 1 are bent toward the metal board 3 by pressure applied from the inner surface of the flat core 9. The sponge 5 is also compressed. When the flat core 9 is disposed between the opposing claws 3a by further insertion into the fixing device 1, the sponge 5 and the claws 3a, which were bent by the pressure applied by the inner surface of the flat core 9, regain their original configuration. As the claws 3a regain their original configuration, the opposing claws 3a engage with both side edges of the flat core 9. Thus the flat core 9 is fixed onto the flat cable 11 via the fixing device 1 taped thereon. As the sponge 5 regains its original configuration, the metal board 3 abuts the inner surface of the flat core 9. This abutment prevents the metal board 3 from fluctuating in relation to the flat core 9. The flat core 9 is thus securely fixed onto the flat cable 11. Since the fixation of the flat core 9 onto the fixing device 1 is attained by the engagement between both of end surfaces of the flat core 9 and the claws 3a, a securer attachment of the flat core 9 is achieved, as compared to the method of using tape.

Second Embodiment

Figure 3:
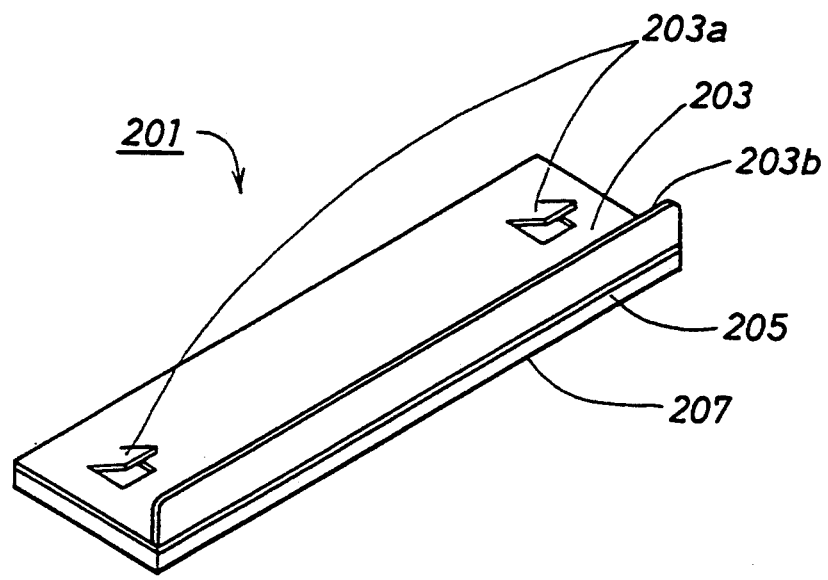
FIG. 3 is a perspective view of a second embodiment of a fixing device.

As shown in FIG. 3, the fixing device 201 is provided with a flange or engaging flap 203b, extending along a first longitudinal edge of the fixing device 201, for engaging with a flat core on one side of a rectangular metal board 203. The engaging flap 203b is integrally formed as part of the metal board 203. Claws 203a are provided in the vicinity of both ends opposite the engaging flap 203b. The claws 203a protrude toward the engaging flap 203b. A sponge 205 is attached on the other surface of the metal board 203. Further, a double-coated adhesive tape 207 is attached on the surface of the sponge 205 opposite the metal board 203 in order to attach the fixing device 201 onto a flat cable.

Subsequently, the flat cable, with the fixing device 201 attached thereon, is inserted into the flat core from the side of the claws 203a until the flat core engages with the engaging flap 203b. Thereby, the flat core is fixed between the claws 203a and the engaging flap 203b. The claws 203a and the engaging flap 203b are equivalent to the engaging portions.

In the fixing device 201, the engaging flap 203b, integrally formed as part of the metal board 203, is provided on the side edge opposite to the pair of the claws 203a. However, the engaging flap 203b can be replaced by several pieces of engaging protrusions at predetermined intervals.

Third Embodiment

Figure 4:
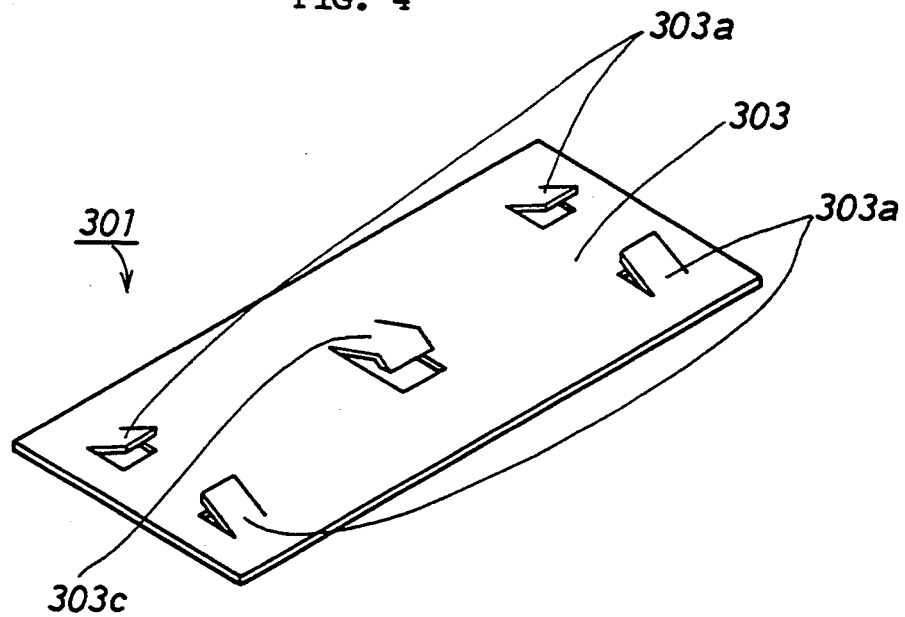
FIG. 4 is a perspective view of a third embodiment of a fixing device.

As shown in FIG. 4, the fixing device 301 comprises two pairs of claws 303a which engage with side edge portions of a flat core in the same manner as the fixing device 1. The fixing device 301 further comprises a hooked-claw 303c at the center of the rectangular metal board 303. The hooked-claw 303c is bent at its end toward the metal board 303.

When the flat core is disposed between the opposing claws 303a, the hooked-claw 303c presses against an inner surface of the flat core. This pressure securely prevents the flat core from fluctuating even without a sponge on the opposite surface of the metal board 303. Since the hooked-claw 303c is bent at its end toward the metal board 303, the fixing device 301 can be inserted from either side thereof.

Fourth Embodiment

Figure 5:
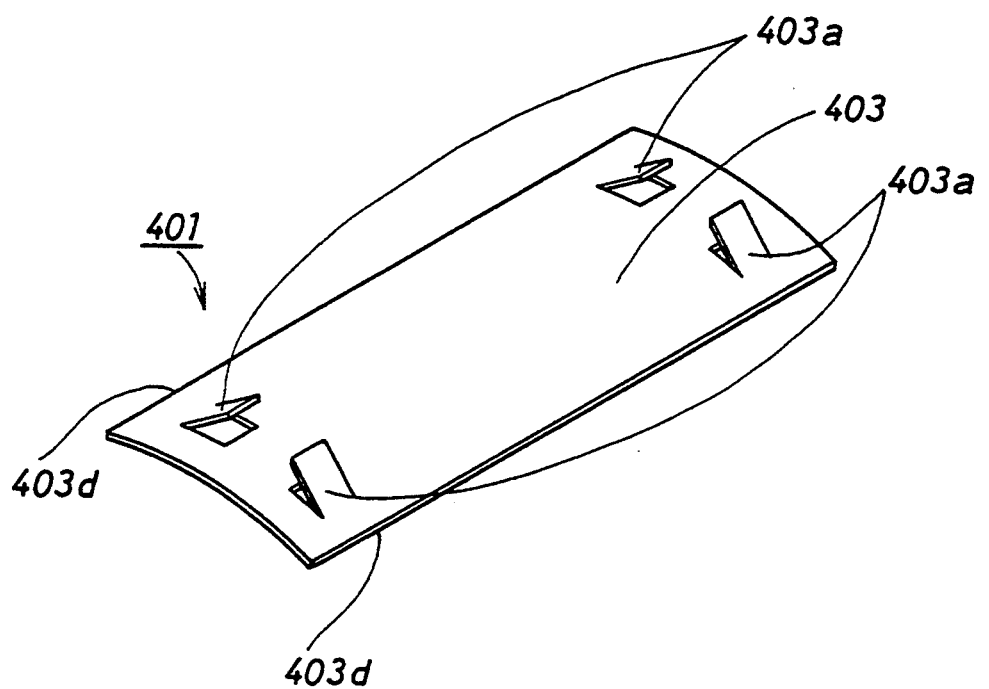
FIG. 5 is a perspective view of a fourth embodiment of a fixing device.

As shown in FIG. 5, the fixing device 401 comprises two pairs of claws 403a formed in the vicinity of opposing ends of a rectangular metal board 403. The claws 403a engage with side edge portions of a flat core in the same manner as the fixing device 1. The metal board 403 is curved or radiused between opposed side edges 403d, that is, the board has a curved transverse cross section. The difference in height between the side edges 403d and the center of the metal board 403 is a little larger than the distance between an inner surface of a flat core and an exterior surface of the flat cable.

In order to use the fixing device 401 thus constructed, the metal board 403 is deformed manually into substantially a planar member. Then the fixing device 401 is inserted into a space between an inner surface of the flat core and an exterior surface of a flat cable. When the fixing device 401 is released after the insertion, the metal board 403 regains its original shape, thereby engaging the flat core at the center thereof as well as engaging the exterior surface of the flat cable at the side edges 403d. This pressure fixes the fixing device 401 to the exterior surface of the flat cable. Further, as the claws 403a engage both side edge portions of the flat core in the same manner as the fixing device 1, the flat core can be easily fixed onto the flat cable at a desired position thereof.

This invention has been described above with reference to preferred embodiments as shown in the drawings. Modifications and alterations may become apparent to one skilled in the art upon reading and understanding the specification. Despite the use of the embodiments for illustration purposes, it is intended to include all such modifications and alterations within the scope and the spirit of the appended claims.

In this spirit, it should also be noted that the fixing devices 1–401 according to this invention can fix a noise absorber onto a variety of flat wires, such as a flexible printing board (FPC). Although the base member and the engaging portions are formed of metal in the above embodiments, the base member and the engaging portions can be formed of a variety of materials, such as synthetic resin.

In the embodiments, the engaging portions are the claws 3a–403a formed by pushing out portions of the metal board defined by slits. However, the engaging portions may be formed by other methods. For example, the engaging portions can be protrusions or steps formed by press working at a predetermined position on the metal board. Although the claws 3a–403a are resilient in the embodiments, they do not necessarily have to be resilient when the wire is covered with a synthetic resin or other elastic material. This is because the fixing device and the wire can be inserted into the noise absorber by compressing the elastic material covering the wire.

In the embodiments, both side edges of the metal boards 3–403 project past both side edges of the flat core. The claws 3a–403a are provided on the projecting portion of the metal boards 3–403. However, the engaging portions may comprise metal pieces provided at side edges of the metal board extending parallel thereto and bent upward at predetermined positions. In this case, since neither of the side edges of the metal board has to project past the side edges of the noise absorber, fixation of a larger noise absorber is possible.

In the first and the second embodiments, the sponges 5 and 205 are attached on undersides of the metal boards 3 and 203. Further, the double-coated adhesive tapes 7 and 207 are attached on the surfaces of the sponges 5 and 205. However, the double-coated adhesive tapes 7 and 207 may be directly attached on the undersides of the metal board 3 and 203. Alternatively, a fixture to which an adhesive is applied may be positioned on an underside of a metal board for attaching the metal board to an exterior surface of a wire. In this case, when a fixing device is not used, the adhesive side of the fixture is preferably covered with a separate sheet.

In the first through the third embodiments, the metal boards 3–303 are of planar and rectangular configuration to be attached to flat cables. However, the metal boards 3–303 303 may have an arched cross section to be attachable to a wire having a circular transverse cross section.

Wherefore having described the present invention, what is claimed is:

1. A fixing device in combination with an electrical noise absorber for securing the electrical noise absorber to an exterior surface of a wire, said combination comprising:
   a ferrite core electrical noise absorber having an aperture extending therethrough, the aperture being sized for accommodating a wire and a base member therein, and the aperture having an inner surface;
   the base member being insertable into a space formed between the exterior surface of the wire and the inner surface of the aperture, once the noise absorber surrounds the wire;
   at least one pair of opposed projections formed in a first surface of said base member for intimately engaging opposed axial side edges of the noise absorber, after insertion of said base member into the space; and
   securing means, supported by said base member, for securing a second surface of said base member to the exterior surface of the wire.

2. A combination according to claim 1, wherein said securing means comprises a first surface of a sponge attached to a second opposite surface of said base member and a first surface of a double-coated adhesive tape attached to a second opposite surface of said sponge and a second opposite surface of said double-coated adhesive tape is provided with a removable sheet.

3. A combination according to claim 1, wherein said base member made of metal and is substantially rectangular in shape.

4. A combination according to claim 1, wherein said base member is substantially planar.

5. A fixing device according to claim 1, wherein said fixing device includes two pairs of projections with a first pair of the opposed projection projecting from the first surface adjacent one end of said base member and extending toward one another and a second pair of the opposed projection projecting from the first surface adjacent the other end of said base member and extending toward one another.

6. A combination according to claim 5, wherein said first and second pairs of opposed projection are formed integrally in said base member and are spaced to receive intimately the cylindrical noise absorber.

7. A combination according to claim 1, wherein said base member has a width at least as wide as the noise absorber.

8. A fixing device for securing an electrical noise absorber, having an aperture extending therethrough, to a wire, said fixing member comprising:
   a base member being insertable into a space formed between an exterior surface of the wire and an inner surface of the aperture, when the noise absorber surrounds the wire;
   engaging means provided on a first surface of said base member for intimately engaging opposed axial side edges of the noise absorber, after insertion of said base member into the space; and
   securing means, supported by said base member, for securing said base member to the exterior surface of the wire,
   wherein said engaging means comprises a flange located adjacent a first axial edge of said base member and projecting from the first surface of the base member and a first claw projecting from the first surface adjacent one end of said base member and extending toward said flange and a second claw projecting from the first surface adjacent the other end of said base member and extending toward said flange.

9. A fixing device according to claim 8, wherein said flange and said first and second claws are formed integrally in said base member and are spaced to receive intimately axial side edges of the noise absorber.

10. A fixing device for securing a noise absorber, having an aperture extending therethrough, to a wire, said fixing member comprising:
    a base member being insertable into a space formed between an exterior surface of the wire and an inner surface of the aperture, when the noise absorber surrounds the wire;
    engaging means provided on a first surface of said base member for intimately engaging opposed axial side edges of the noise absorber, after insertion of said base member into the space; and
    securing means, supported by said base member, for securing said base member to the exterior surface of the wire, said engaging means comprising a first pair of opposed claws projecting from the first surface adjacent one end of said base member and extending toward one another and a second pair of opposed claws projecting from the first surface adjacent the other end of said base member and extending toward one another, wherein a hooked claw member, projecting from the first surface of said base member, is provided between said two pairs of opposed claws.

11. A fixing device according to claim 10, wherein an end of said claw member remote from said base member is bent toward said base member to facilitate engagement with the noise absorber.

12. A fixing device in combination with an electrical noise absorber for securing the electrical noise absorber to an exterior surface of a wire, said combination comprising:
    a ferrite core electrical noise absorber having an aperture extending therethrough, the aperture being sized for accommodating a wire and a base member therein and the aperture having an inner surface;
    a base member being insertable into a space formed between the exterior surface of the wire and the inner surface of the aperture, once the noise absorber surrounds the wire, said base member having a curved transverse cross section and being deformable into a substantially planar member during insertion into the noise absorber and returning to its initial curved cross section after insertion into the space so that axial side edges of said base member can engage the exterior surface of the wire and a central axial portion of said base member can engage the inner surface of the aperture to secure said base member and the electrical noise absorber to the exterior surface of the wire; and
    engaging means provided on a first surface of said base member for intimately engaging opposed axial side edges of the noise absorber after insertion of said base member into the space.

13. A combination according to claim 12, wherein said base member made of metal and is substantially rectangular in shape.

14. A combination according to claim 12, wherein said engaging means comprises a first pair of opposed claws projecting from the first surface adjacent one end of said base member and extending toward one another and a second pair of opposed claws projecting from the first surface adjacent the other end of said base member and extending toward one another.

15. A combination according to claim 14, wherein said first and second pairs of opposed claws are formed integrally in said base member and are spaced to receive intimately the noise absorber.

16. A combination according to claim 12, wherein said base member has a width at least as wide as the noise absorber.

* * * * *